(12) United States Patent
Innes et al.

(10) Patent No.: US 12,617,153 B2
(45) Date of Patent: May 5, 2026

(54) THREE-DIMENSIONAL PRINTING SYSTEM WITH RESIN VESSEL POSITIONING SYSTEM

(71) Applicant: 3D Systems, Inc., Rock Hill, SC (US)

(72) Inventors: Eric M. Innes, San Diego, CA (US); James Howey, Kapaa, HI (US)

(73) Assignee: 3D SYSTEMS, INC., Rock Hill, SC (US)

( * ) Notice: Subject to any disclaimer, the term of this patent is extended or adjusted under 35 U.S.C. 154(b) by 118 days.

(21) Appl. No.: 18/913,055

(22) Filed: Oct. 11, 2024

(65) Prior Publication Data

US 2025/0128472 A1    Apr. 24, 2025

Related U.S. Application Data

(60) Provisional application No. 63/591,139, filed on Oct. 18, 2023.

(51) Int. Cl.
| | |
|---|---|
| *B29C 64/259* | (2017.01) |
| *B29C 64/307* | (2017.01) |
| *B33Y 10/00* | (2015.01) |
| *B33Y 30/00* | (2015.01) |
| *B33Y 40/00* | (2020.01) |

(52) U.S. Cl.
CPC .......... *B29C 64/259* (2017.08); *B29C 64/307* (2017.08); *B33Y 10/00* (2014.12); *B33Y 30/00* (2014.12); *B33Y 40/00* (2014.12)

(58) Field of Classification Search
CPC ... B29C 64/259; B29C 64/307; B29C 64/124; B29C 64/255; B33Y 10/00; B33Y 30/00; B33Y 40/00
See application file for complete search history.

(56) References Cited

U.S. PATENT DOCUMENTS

| | | | |
|---|---|---|---|
| 5,787,733 A | 8/1998 | Volpi | |
| 7,357,629 B2 | 4/2008 | Weiskopf et al. | |
| 7,585,450 B2 * | 9/2009 | Wahlstrom | B22F 12/84 |
| | | | 264/401 |
| 7,790,096 B2 | 9/2010 | Merot et al. | |

(Continued)

FOREIGN PATENT DOCUMENTS

WO        2022/235549 A1    11/2022

OTHER PUBLICATIONS

PCT International Search Report and Written Opinion for International Search Authority for PCT/US2024/050942, mailed Mar. 3, 2025 (14 pages).

*Primary Examiner* — Michael M. Robinson

(57) ABSTRACT

A three-dimensional (3D) printing system includes a print engine and a resin vessel. The print engine includes a pair of support plates in facing relation that define a receiving space therebetween. The pair of support plates include a pair of profiled ramps and a pair of hooks extending into the receiving space. An outer surface of the resin vessel includes a plurality of fixed rollers and a pair of cam rollers. The plurality of fixed rollers are configured to partially engage the pair of profiled ramps when the resin vessel is translated into the receiving space. In response to being revolved about the horizontal axis, the pair of cam rollers are configured to engage the pair of hooks and to lift and translate the plurality of fixed rollers into complete engagement with the pair of profiled ramps.

14 Claims, 6 Drawing Sheets

(56)  References Cited

U.S. PATENT DOCUMENTS

| | | | |
|---|---|---|---|
| 2007/0075460 A1 | 4/2007 | Wahlstrom et al. | |
| 2007/0077323 A1* | 4/2007 | Stonesmith | B29C 64/182 |
| | | | 425/174 |
| 2021/0268743 A1 | 9/2021 | Myllyla et al. | |
| 2022/0258409 A1* | 8/2022 | Alonzo | B29C 64/124 |
| 2023/0089055 A1 | 3/2023 | Innes | |

* cited by examiner

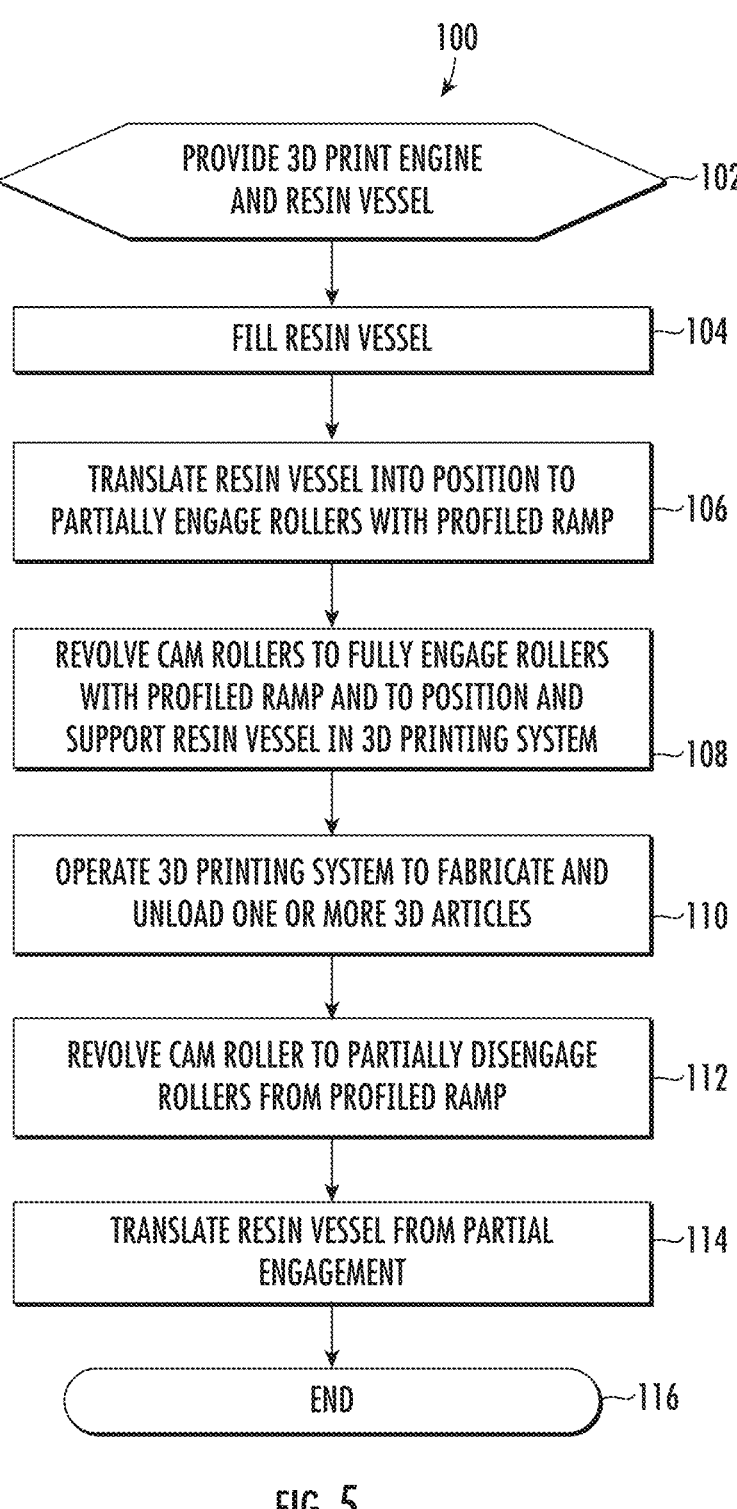

*100*

PROVIDE 3D PRINT ENGINE
AND RESIN VESSEL — 102

FILL RESIN VESSEL — 104

TRANSLATE RESIN VESSEL INTO POSITION TO
PARTIALLY ENGAGE ROLLERS WITH PROFILED RAMP — 106

REVOLVE CAM ROLLERS TO FULLY ENGAGE ROLLERS
WITH PROFILED RAMP AND TO POSITION AND
SUPPORT RESIN VESSEL IN 3D PRINTING SYSTEM — 108

OPERATE 3D PRINTING SYSTEM TO FABRICATE AND
UNLOAD ONE OR MORE 3D ARTICLES — 110

REVOLVE CAM ROLLER TO PARTIALLY DISENGAGE
ROLLERS FROM PROFILED RAMP — 112

TRANSLATE RESIN VESSEL FROM PARTIAL
ENGAGEMENT — 114

END — 116

FIG. 5

THREE-DIMENSIONAL PRINTING SYSTEM WITH RESIN VESSEL POSITIONING SYSTEM

CROSS-REFERENCE TO RELATED APPLICATIONS

This non-provisional patent application claims priority to U.S. Provisional Application Ser. No. 63/591,139, Entitled "Three-Dimensional Printing System with Resin Vessel Positioning System" by Eric M. Innes et al., filed on Oct. 18, 2023, incorporated herein by reference under the benefit of U.S.C. 119(e).

FIELD OF THE INVENTION

The present disclosure concerns an apparatus and method for the digital fabrication of three-dimensional (3D) articles by a layer-by-layer solidification of a build material. More particularly, the present disclosure concerns a way of accurately positioning a resin vessel into a print engine.

BACKGROUND 3D printing systems are in wide use for prototyping and manufacturing articles. One type of 3D printing system utilizes a process called stereolithography. A typical stereolithography system includes a resin vessel and a print engine. The resin vessel is extremely heavy and can be mounted upon swivel wheels or casters. The resin vessel is pushed into the print engine before a fabrication process starts. One challenge is when a factory floor under the resin vessel and print engine is uneven. The result can be manufacturing accuracy issues due to relative vertical and angular positioning between the resin vessel and the print engine.

SUMMARY

In a first aspect of the disclosure, a three-dimensional (3D) printing system includes a print engine and a resin vessel. The print engine includes a pair of support plates in facing relation that define a receiving space therebetween. The pair of support plates include a pair of profiled ramps and a pair of hooks extending into the receiving space. The resin vessel has opposing inner and outer surfaces. The inner surface defines a reservoir configured to contain photocurable resin. The outer surface includes a plurality of fixed rollers and a pair of cam rollers. The plurality of fixed rollers are configured to partially engage the pair of profiled ramps when the resin vessel is initially translated into the receiving space which partially loads the resin vessel into the print engine. The pair of cam rollers are coupled to a horizontal axle and configured to be received by the pair of hooks when the resin vessel is initially translated into the receiving space. In response to being revolved about the horizontal axis, the pair of cam rollers are configured to engage the pair of hooks and to lift and translate the plurality of fixed rollers into complete engagement with the pair of profiled ramps as the resin vessel is fully loaded into the receiving space.

This system allows a very heavy resin vessel to be accurately and easily positioned relative to the print engine even with a non-level floor. Engagement of the profiled ramps with the fixed rollers provides a stable and accurate positioning of the resin vessel. The cam rollers engaging the hooks facilitates loading and unloading of the resin vessel and fixed rollers onto and off of portions of the profiled ramps.

In one implementation, the print engine further includes a build plate, a vertical movement mechanism coupled to the build plate, an imaging subsystem, and a controller. The controller is configured to operate, inter alia, the vertical movement mechanism and the imaging subsystem to fabricate a three-dimensional (3D) article in a layer-by-layer manner.

In another implementation the pair of profiled ramps individually include a curved leading portion, a flat middle portion, and a curved trailing portion. The pair of hooks can be located directly above the curved leading portion of the pair of profiled ramps. The plurality of fixed rollers includes a pair of leading rollers and a pair of trailing rollers. Partial engagement of the plurality of fixed rollers includes the pair of leading rollers individually engaging a top surface of the flat middle portion and the pair of trailing rollers individually engaging a top surface of the curved leading portion. The pair of leading rollers are above the pair of trailing rollers to enable the partial engagement. The complete engagement of the plurality of fixed rollers includes the pair of leading rollers individually engaging a top surface of the curved trailing portion and the pair of trailing rollers individually engaging the flat middle portion.

In yet another implementation, the pair of cam rollers includes a handle and wherein revolution of the handle about the horizontal axle revolves the pair of cam rollers about the horizontal axis. The handle has two positions including a raised position and a lowered position. In the raised position the plurality of fixed rollers are partially engaged with the pair of profiled ramps. In the lowered position the plurality of fixed rollers are fully engaged with the pair of profiled ramps.

In a second aspect of the disclosure, a method for manufacturing a three-dimensional article includes providing the 3D printing system of the first aspect and then: (1) translating the resin vessel into the receiving space of the print engine and (a) partially engaging the plurality of fixed rollers with the pair of profiled ramps and (b) receiving the pair of cam rollers by the pair of hooks; (2) rotating the pair of cam rollers and engaging the pair of hooks by the pair of cam rollers and thus fully loading the resin vessel into the receiving space including lifting and translating the plurality of fixed rollers into complete engagement with the pair of profiled ramps.

BRIEF DESCRIPTION OF THE FIGURES

FIG. 5 is a flowchart of an embodiment of a method of manufacturing a 3D article.

DETAILED DESCRIPTION OF THE PREFERRED EMBODIMENTS

Figure 1:
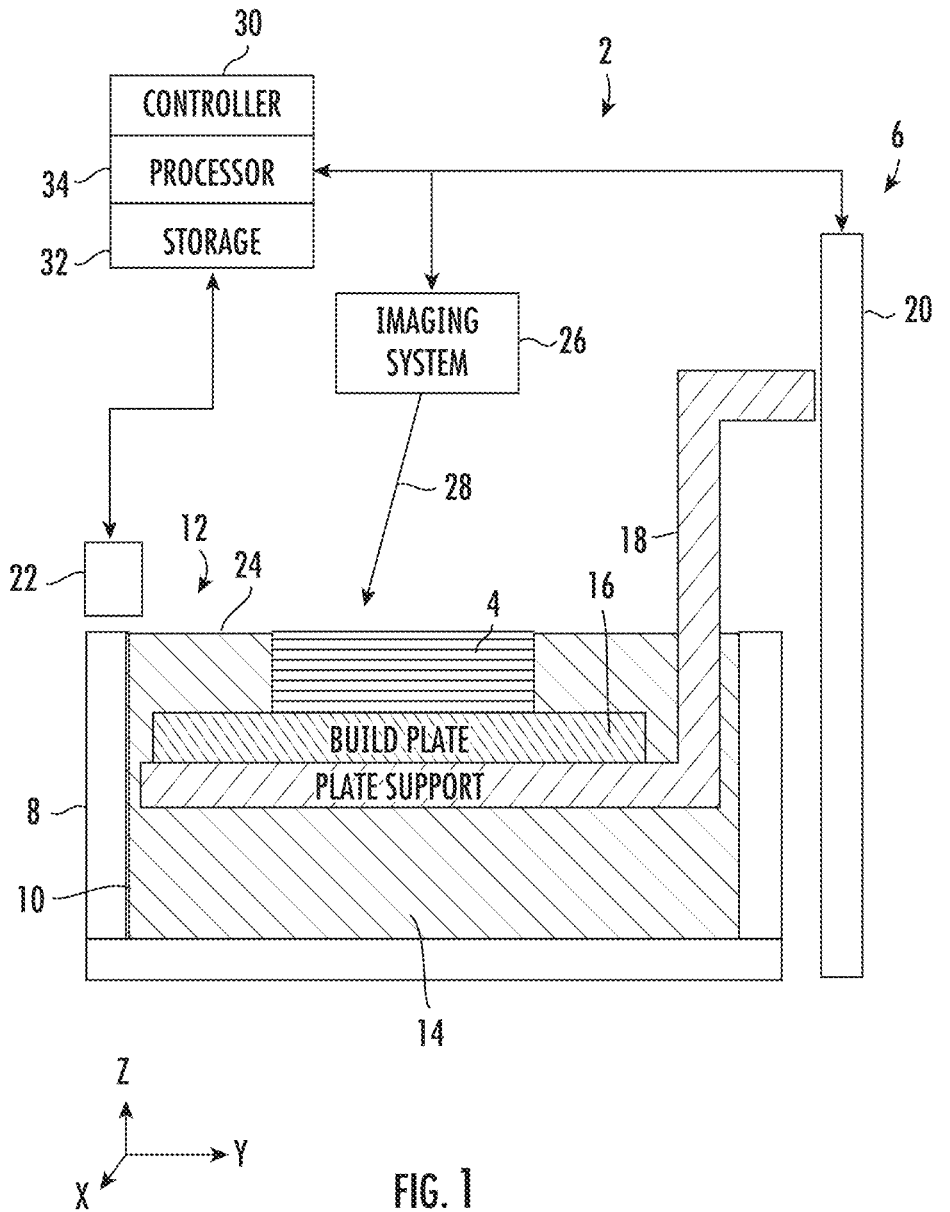
FIG. 1 is a schematic representation of an embodiment of a three-dimensional (3D) printing system which includes a print engine, a resin vessel, and a controller.

FIG. 1 is a schematic representation of an embodiment of a three-dimensional (3D) printing system 2 configured for manufacturing a 3D article 4. In describing system 2, mutually orthogonal axes X, Y, and Z will be utilized and otherwise referred to as an X-axis, a Y-axis, and a Z-axis. Theta-X, theta-Y, or theta-Z refer to rotation about an axis parallel to the X-axis, Y-axis, or Z-axis respectively. Axes X and Y are lateral axes that are generally horizontal. Axis Z is a vertical axis that is generally aligned with a gravitational reference. The term "generally" implies that a direction or magnitude is not necessarily exact but is by design. Terms such as horizontal, vertical, perpendicular, or aligned are generally by engineering design and intent and are accurate to within manufacturing tolerances.

Manufacturing tolerances may be affected factors such as the type of material being used in constructing a component of a system. Manufacturing tolerances may also be affected by a particular process sequence used in fabricating and assembling parts of a system.

3D printing system 2 includes a print engine 6 and a resin vessel 8. The resin vessel 8 has an inner surface 10 defining a reservoir 12 configured to contain a photocurable resin 14. The photocurable resin 14 is a liquid polymer resin that includes, inter alia, one or more monomers and one or more catalysts. The photocurable resin 14 is configured to polymerize and harden from a liquid state to a solid state during a radiation cure process. The radiation cure process includes radiative exposure of the photocurable resin to blue, violet, and/or ultraviolet radiation or a wavelength distribution within a range of 100 to 500 nanometers (nm). The radiation cure process can utilize radiation having one or more spectral peaks that are preferably optimized for the catalyst (s).

The print engine 6 includes a build plate 16 supported by a plate support 18. The 3D article 4 is fabricated by selectively forming a sequence of layers of hardened photocurable resin 14 upon a top surface of the build plate 16. A vertical movement mechanism 20 is coupled to the plate support 18. In one embodiment, the vertical movement mechanism 20 includes a motorized lead screw that is threaded into a threaded bearing. The threaded bearing is attached to the plate support 16. A motor fixed in location turns the lead screw and in doing so translates the plate support 16 up and down. In another embodiment, the vertical movement mechanism 20 can be based upon a cable and motorized pulley. Such movement mechanisms are known in the art of stereolithography, and two-dimensional and three-dimensional printing. Any such movement mechanisms can incorporate gear reduction mechanisms for improving torque and positioning accuracy.

The print engine 6 includes a coater 22 which includes a motorized wiper module. In one embodiment, the wiper module is a rectangular block with a wiper blade that extends downward to a build plane 24 and along the X-axis. The wiper module is constrained to translate along the Y-axis by one or two linear bearings and can be moved up and down along the Z-axis by a motor or solenoid valve. In an alternative embodiment, the linear bearing(s) constraining the wiper module can be moved up and down by actuators. Such actuators can individually be based upon a motorized screw and threaded bearing, a motor drive cam, a solenoid valve, or other such vertical movement mechanisms. A belt and pulley system translates the wiper module along the Y-axis. The belt is tensioned between two pulleys, one of which is coupled to a motor. The wiper module is coupled to a portion of the tensioned belt. As the motor rotates one of the two pulleys, the effect is to translate the wiper module along the Y-axis. Other mechanisms for translating the wiper module are possible, such as a motorized lead screw received into a threaded bearing carried by the wiper module. Various wiper modules are well known in 3D printing including stereolithography.

An imaging system 26 is configured to impart radiation to the build plane 24 to selectively cure a layer of the photocurable resin 14 over build plane 24 and onto an upper surface of a partially formed 3D article 4 (or initially onto build plate 16). In one embodiment, the imaging system 26 includes a laser reflected in sequence by two galvanometer mirrors so as to scan an emitted laser beam 28 over the build plane 24 along the X and Y axes. In another embodiment, the imaging system 26 can employ an array of light emitting diodes or lasers that are scanned over the build plane 24. Yet other imaging subsystems can employ light sources and light modulators. The light sources can emit blue, violet, and/or ultraviolet radiation (100-500 nm) for selectively curing layers of the photocurable resin 14. Various types of imaging systems 26 are known in the art for stereolithography and other 3D printing systems.

A controller 30 is coupled to the vertical movement mechanism 20, the coater 22, the imaging subsystem 26, and other portions of the print engine 6. The controller 30 includes a non-transient or non-volatile information storage device 32 coupled to a processer 34. Controller 30 can be a single microcontroller that is co-located with print engine 6 or it can include multiple computers that can include two or more of a microcontroller, a desktop computer, a laptop computer, a server computer, and other computing devices. The information storage device 32 stores software instructions that, when executed by processor 34, operate the vertical movement mechanism 20, the coater 22, the imaging subsystem 26, and other portions of the print engine 6.

Figure 2:
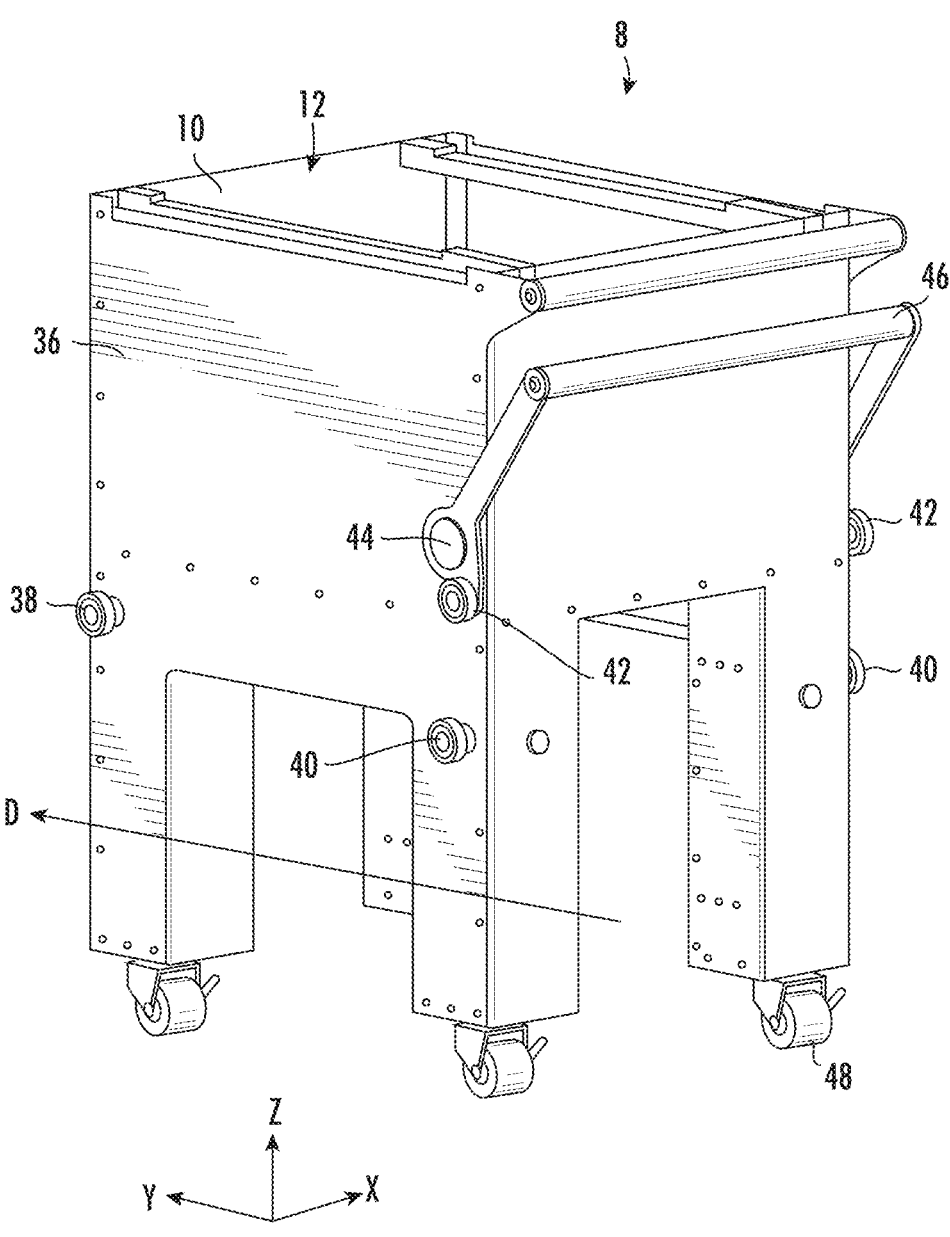
FIG. 2 an isometric view of an embodiment of a resin vessel.

FIG. 2 is an isometric view of an embodiment of a resin vessel 8 configured for installation into the print engine 6 (FIG. 1) and having opposing inner 10 and outer 36 surfaces. Inner surface 10 defines a reservoir 12 configured to contain the photocurable resin 14.

The outer surface 36 includes a plurality of fixed rollers 38, 40 and a pair of cam rollers 42. The plurality of fixed rollers 38, 40 includes a pair of leading rollers 38 and a pair of trailing rollers 40. The terms "leading" and "trailing" are relative terms in relation to a direction (D) of installation which is parallel to the Y-axis. In other words, as the resin vessel 8 is translated into the print engine 6, the leading rollers 38 enter the print engine 6 first followed by the trailing rollers 40. Each pair of rollers 38, 40, and 42 extend outward from the outer surface 36 in opposing directions (−X and +X).

Figures 3, 4:
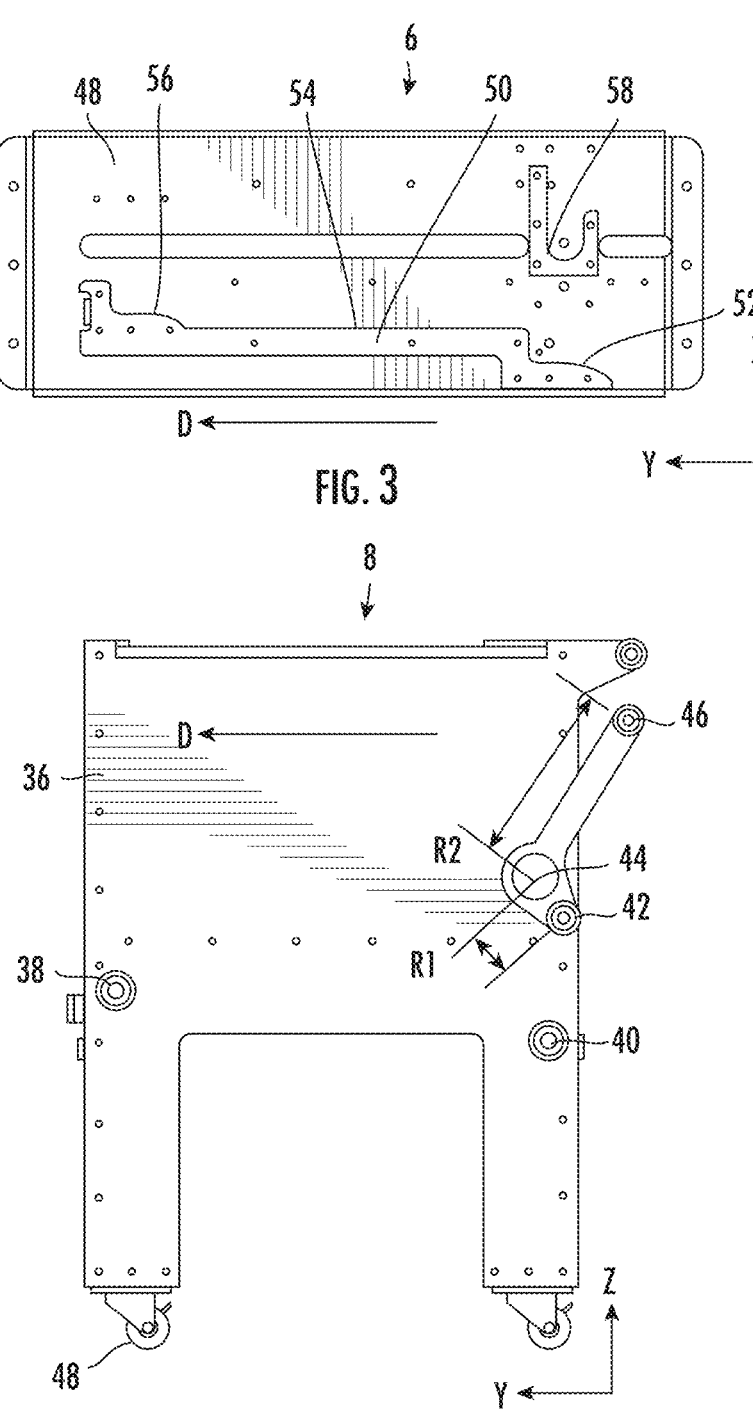
FIG. 3 is a lateral view of an embodiment of a support plate in isolation which forms a portion of a print engine.
FIG. 4 is a side view of an embodiment of a resin vessel.

The pair of cam rollers 42 are mounted to a horizontal axle 44. The horizontal axle 44 is parallel to the X-axis. Thus, the pair of cam rollers 42 can revolve around the horizontal axis 44 which has a rotational vector of theta-X (about an axis parallel to the X-axis). Attached to the pair of cam rollers 42 is a handle 46. Handle 46 enables a manual and leveraged revolution of the pair of cam rollers 42. The pair of cam rollers 42 are mounted at a first radius (R1) from the axle 44 (FIG. 4). The handle 46 is mounted at a second radius (R2) from the axle 44. The first (R1) and second (R2) radii are perpendicular to the axis of rotation. The second (R2) radius is greater than the first radius (R1) to provide leverage for a user that is lowering or raising the handle. Preferably R2 at least equals two or three times R1 to provide an effective leverage.

The resin vessel 8 is mounted to a plurality of rotating wheels or casters 48. Casters 48 allow the resin vessel 8 to be manually rolled and translated into the print engine 6.

FIG. 3 is a lateral view of an embodiment of a support plate 48 in isolation which forms a portion of the print engine 6. Print engine 6 includes a pair of inward facing support plates 48 that partially enclose a receiving space 49 (FIG. 6A) therebetween for receiving the resin vessel 8 along direction D.

The pair of support plates 48 include a pair of profiled ramps 50 that extend into the receiving space. Each profiled ramp 50 includes a curved leading portion 52, a flat middle portion 54, and a curved trailing portion 56. Element numbers 52, 54, and 56 designate upper surfaces of the curved leading portion 52, flat middle portion 54, curved trailing portion 56 of the profiled ramp 50 respectively. Positioned above the pair of curved leading portions 52 are a pair of hooks 58 that also extend into the receiving space 49.

FIG. 4 is a side view of an embodiment of the resin vessel 8 with the handle 46 in a raised or disengaged position. When the resin vessel 8 is initially or partially rolled or translated along D into the receiving space, the pair of leading rollers 38 engage the pair of flat middle portions 54. Concurrently, the pair of trailing rollers 40 engage the pair of curved leading portions 52. Also concurrently, the cam roller 42 is received by hook 58.

A user (of printing system 2) can then pull the handle 46 down to a lowered and engaged position. Lowering handle 46 causes the pair of cam rollers 42 to revolve around axle 44 and to push upon the pair of hooks 58. This has the effect of moving the resin vessel 8 into complete engagement with print engine 6. Concurrently, the pair of leading rollers 38 engage with the curved trailing portions 56 of the pair of profiled ramps 50. Also concurrently, the pair of trailing rollers 40 are lifted onto and engage the flat middle portions 54 of the pair of profiled ramps 50. Once handle 46 is in the lowered and engaged position, the resin vessel 8 is fully installed, supported, and positioned in the print engine 6.

To disengage the resin vessel 8, the handle 46 is moved from the lowered to a raised and disengaged position. As the handle 46 is raised, the pair of cam rollers 42 revolve around the axle 44 and push on the pair of hooks 58. This has the effect of moving the resin vessel 8 from complete engagement to partial engagement. Concurrently, the pair of leading rollers 38 move from the curved trailing portions 56 to the flat middle portions 54 of the pair of profiled ramps 50. Also concurrently, the pair of trailing rollers 40 move from the flat middle portions 54 to the curved leading portions 52 of the pair of profiled ramps 50. The user can then translate the resin vessel 8 in the −D direction completely out of the receiving space.

In an alternative embodiment (or even in addition), the pair of cam rollers 42 can be motorized. Instead of a user lowering and raising the arm 46, a motor can turn the axle 44 and revolve the cam rollers 42 in the same way as described supra. The motor can be coupled to the axle 44 with a reductive gear train that increases torque and provides an appropriate angular velocity of the axle 44.

Figure 6A:
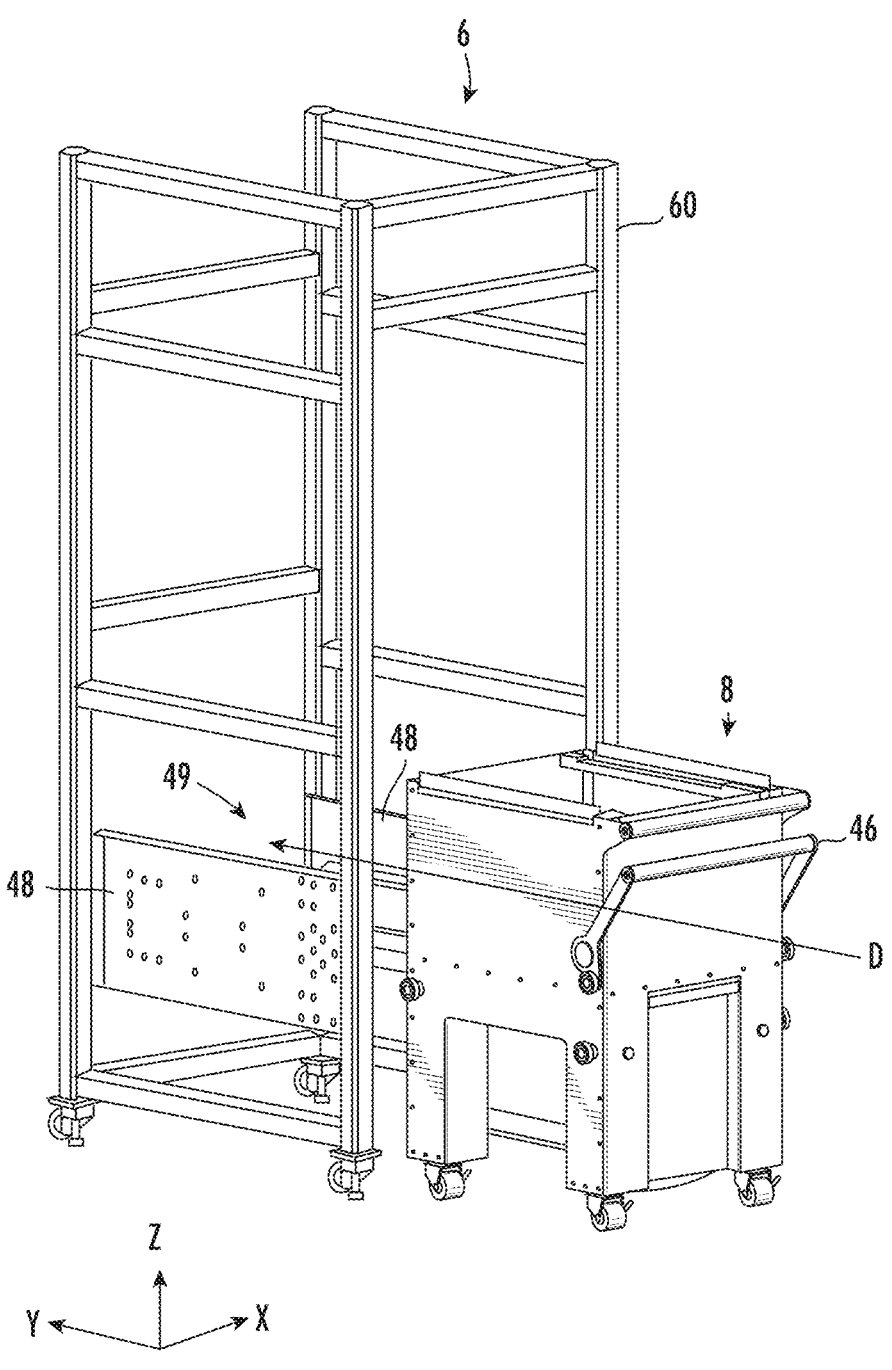
FIG. 6A is an isometric view of an embodiment of a portion of a print engine and a resin vessel positioned for installation into the print engine.

FIG. 5 is a flowchart for manufacturing the 3D article 4 using printing system 2. According to 102, the print engine 6 and resin vessel 8 are initially separated as shown in FIG. 6A. FIG. 6A is an isometric view including a frame 60 supporting the pair of support plates 48 in facing relation with each other and partially enclosing the receiving space 49. Other elements of printing system 6 are left out for simplicity. The arm 46 is in the up or disengaged position.

According to 104, the resin vessel 8 is filled with photo-curable resin 14. Alternatively, the resin vessel 8 can be filled with photocurable resin 14 any time before 110—for example, after 108 but before 110.

Figure 6B:
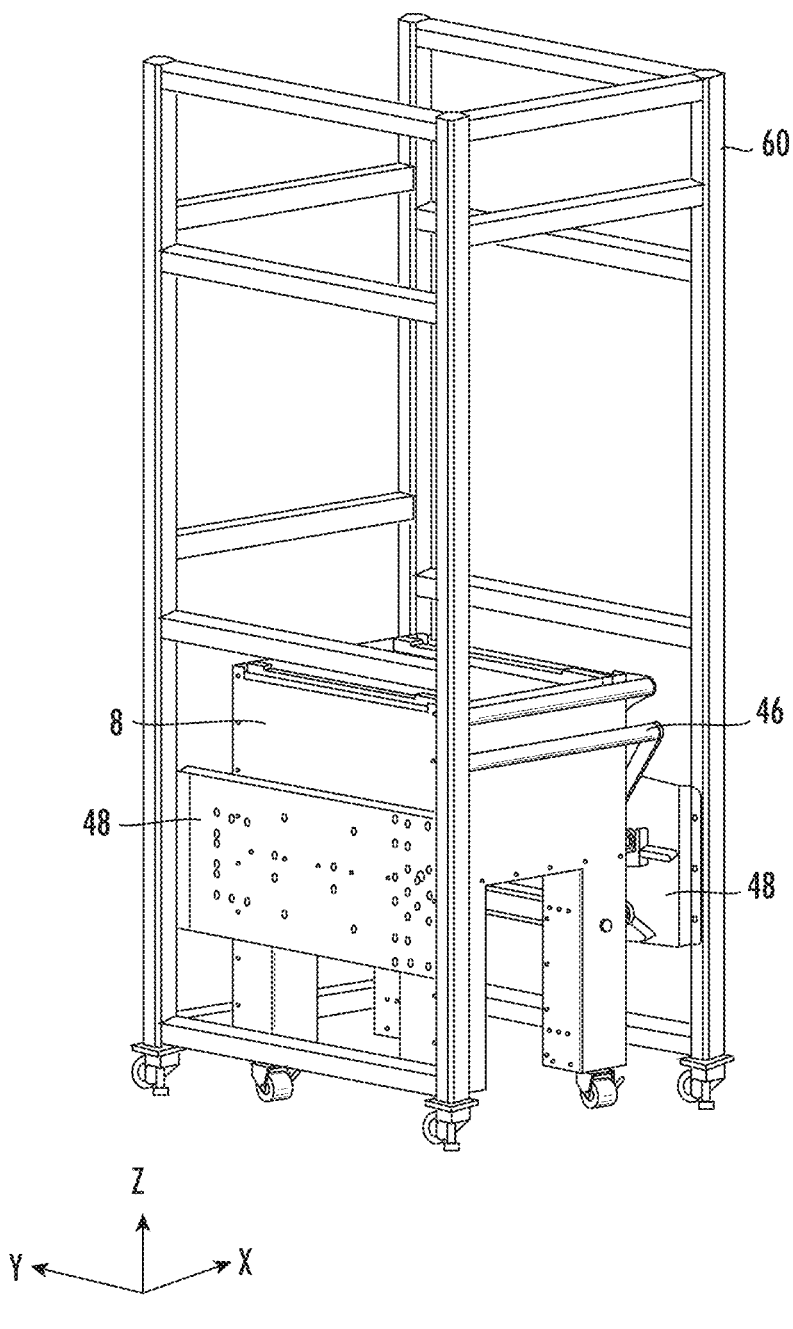
FIG. 6B is an isometric view of an embodiment of a resin vessel partially installed into a print engine.

According to 106, the user translates the resin vessel along the D direction (FIG. 6A) and into a partially engaged position (FIG. 6B). This places the leading rollers 38 over the flat middle portions 54, the trailing rollers 40 over the curved leading portions 52, and the cam rollers 42 in the hooks 58. FIG. 6B is an isometric drawing of the partially engaged state.

According to 108, the arm 46 is lowered to revolve the cam rollers 42 and to fully engage the resin vessel 8 in the print engine 6. This places the leading rollers 38 over the curved trailing portions 56 and the trailing rollers 40 over the flat middle portions 54.

According to 110, the 3D printing system 2 (refer to FIG. 1) is operated to fabricate the 3D article 4 in a layer by layer manner. Steps include, inter alia, (1) operating the vertical movement mechanism 20 to position a top surface of the build plate 16 (and later top surface of 3D article 4) one layer thickness below the build plane 24 (which is tantamount to a top surface of the photocurable resin 14), (2) operating the coater to provide a new layer of the photocurable resin 14 above a top surface of the 3D article 4 or build plate 16, (3) operating the imaging system 26 to selectively cure the new layer of photocurable resin 14, and (4) repeating (1)-(3) to complete fabrication of the 3D article 4. Also included in 110—the 3D article 4 can be unloaded from the 3D printing system 2.

According to 112, the arm 46 is raised to revolve the cam rollers 42 and to move the resin vessel 8 to partial engagement with the print engine 6. This places the leading rollers 38 over the flat middle portions 54 and the trailing rollers 40 over the curved leading portions 52. According to 114, the resin vessel 8 is translated in the −D direction to remove it from the print engine 6. Thus, 116 designates the end of the process. As a note, step 110 may be repeated multiple times before the unloading steps 112 and 114.

The specific embodiments and applications thereof described above are for illustrative purposes only and do not preclude modifications and variations encompassed by the scope of the following claims.

What is claimed:

1. A three-dimensional (3D) printing system comprising:
   a print engine including:
      a pair of support plates in facing relation and defining a receiving space therebetween and including a pair of profiled ramps and a pair of hooks extending into the receiving space;
   a resin vessel having opposing inner and outer surfaces, the inner surface defining a reservoir configured to contain photocurable resin, the outer surface including:
      a plurality of fixed rollers configured to partially engage the pair of profiled ramps when the resin vessel is initially translated into the receiving space thus partially loaded into the receiving space and the print engine;
      a pair of cam rollers coupled to a horizontal axle and configured to be received by the pair of hooks when the resin vessel is initially translated into the receiving space;
      in response to being revolved about the horizontal axle, the pair of cam rollers are configured to engage the pair of hooks and to lift and translate the plurality of fixed rollers into complete engagement with the pair of profiled ramps as the resin vessel is fully loaded into the receiving space.

2. The three-dimensional (3D) printing system of claim 1 wherein the print engine further includes:
   a build plate;

a vertical movement mechanism coupled to the build plate;

an imaging subsystem; and a controller configured to operate, inter alia, the vertical movement mechanism and the imaging subsystem to fabricate a three-dimensional (3D) article in a layer-by-layer manner.

3. The three-dimensional (3D) printing system of claim 1 wherein the pair of profiled ramps individually include a curved leading portion, a flat middle portion, and a curved trailing portion.

4. The three-dimensional (3D) printing system of claim 3 wherein the pair of hooks are located directly above the curved leading portion of the pair of profiled ramps.

5. The three-dimensional (3D) printing system of claim 3 wherein the plurality of fixed rollers includes a pair of leading rollers and a pair of trailing rollers, partial engagement of the plurality of fixed rollers includes the pair of leading rollers individually engaging a top surface of the flat middle portion and the pair of trailing rollers individually engaging a top surface of the curved leading portion.

6. The three-dimensional (3D) printing system of claim 5 wherein the pair of leading rollers are above the pair of trailing rollers to enable the partial engagement.

7. The three-dimensional (3D) printing system of claim 5 wherein complete engagement of the plurality of fixed rollers includes the pair of leading rollers individually engaging a top surface of the curved trailing portion and the pair of trailing rollers individually engaging the flat middle portion.

8. The three-dimensional (3D) printing system of claim 1 wherein the pair of cam rollers includes a handle and wherein revolution of the handle about the horizontal axle revolves the pair of cam rollers about the horizontal axis.

9. The three dimensional (3D) printing system of claim 8 wherein the handle has two positions including a raised position and a lowered position, in the raised position the plurality of fixed rollers are partially engaged with the pair of profiled ramps, in the lowered position the plurality of fixed rollers are fully engaged with the pair of profiled ramps.

10. A method of manufacturing a three-dimensional (3D) article comprising:

providing a three-dimensional (3D) printing system including:

a print engine including:

a pair of support plates in facing relation and defining a receiving space therebetween and including a pair of profiled ramps and a pair of hooks extending into the receiving space;

a resin vessel having opposing inner and outer surfaces, the inner surface defining a reservoir configured to contain photocurable resin, the outer surface including:

a plurality of fixed rollers configured to partially engage the pair of profiled ramps when the resin vessel is initially and partially loaded into the receiving space;

a pair of cam rollers coupled to a horizontal axle and configured to be received by the pair of hooks when the resin vessel is initially and partially translated into the receiving space;

in response to revolution about the horizontal axle, the pair of cam rollers are configured to engage the pair of hooks and to lift and translate the plurality of fixed rollers into complete engagement with the pair of profiled ramps as the resin vessel is fully loaded into the receiving space;

translating the resin vessel into the receiving space of the print engine and:

partially engaging the plurality of fixed rollers with the pair of profiled ramps;

receiving the pair of cam rollers by the pair of hooks;

rotating the pair of cam rollers and engaging the pair of hooks by the pair of cam rollers and thus fully loading the resin vessel into the receiving space including lifting and translating the plurality of fixed rollers into complete engagement with the pair of profiled ramps.

11. The method of claim 10 wherein the 3D printing system further includes a build plate, a vertical movement mechanism coupled to the build plate, and an imaging system, the method further including operating, inter alia, operating the vertical movement mechanism and the imaging system to fabricate the 3D article.

12. The method of claim 10 wherein the pair of profiled ramps individually include a curved leading portion, a flat middle portion, and a curved trailing portion, the plurality of fixed rollers includes a pair of leading rollers and a pair of trailing rollers, partial engagement of the plurality of fixed rollers includes the pair of leading rollers individually engaging a top surface of the flat middle portion and the pair of trailing rollers individually engaging a top surface of the curved leading portion.

13. The method of claim 12 wherein complete engagement of the plurality of fixed rollers includes the pair of leading rollers individually engaging a top surface of the curved trailing portion and the pair of trailing rollers individually engaging the flat middle portion.

14. The method of claim 10 the pair of cam rollers includes a handle and wherein revolution of the handle about the horizontal axle revolves the pair of cam rollers about the horizontal axis, rotating the pair of cam rollers and engaging the pair of hooks by the pair of cam rollers and thus fully loading the resin vessel into the receiving space including lifting and translating the plurality of fixed rollers into complete engagement with the pair of profiled ramps.

* * * * *